(12) United States Patent
Yamaguchi et al.

(10) Patent No.: US 11,428,616 B2
(45) Date of Patent: Aug. 30, 2022

(54) CENTRIFUGAL SEDIMENTATION TYPE PARTICLE SIZE DISTRIBUTION MEASURING DEVICE

(71) Applicant: HORIBA, Ltd., Kyoto (JP)

(72) Inventors: Tetsuji Yamaguchi, Kyoto (JP); Takeshi Akamatsu, Kyoto (JP); Tatsuo Igushi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 17/287,831

(22) PCT Filed: Oct. 29, 2019

(86) PCT No.: PCT/JP2019/042263
§ 371 (c)(1),
(2) Date: Apr. 22, 2021

(87) PCT Pub. No.: WO2020/090775
PCT Pub. Date: May 7, 2020

(65) Prior Publication Data
US 2021/0310925 A1 Oct. 7, 2021

(30) Foreign Application Priority Data
Oct. 31, 2018 (JP) .............................. JP2018-205625

(51) Int. Cl.
*G01N 15/02* (2006.01)
*G01N 15/04* (2006.01)
*G01N 21/07* (2006.01)

(52) U.S. Cl.
CPC ....... *G01N 15/0205* (2013.01); *G01N 15/042* (2013.01); *G01N 21/07* (2013.01); *G01N 2015/045* (2013.01)

(58) Field of Classification Search
CPC ............... G01N 15/04; G01N 15/0211; G01N 15/0255; G01N 15/0205; G01N 15/042;
(Continued)

(56) References Cited

U.S. PATENT DOCUMENTS 5,786,898 A * 7/1998 Fitzpatrick ........... G01N 15/042
356/426
11,047,786 B2 * 6/2021 Yamaguchi ........ G01N 15/0255
(Continued)

FOREIGN PATENT DOCUMENTS

JP S56-161554 U 12/1981
JP S59-58361 U 4/1984
(Continued)

OTHER PUBLICATIONS

PCT, International Search Report for the corresponding application No. PCT/JP2019/042263, dated Jan. 21, 2020, with English translation.
(Continued)

*Primary Examiner* — Hoa Q Pham
(74) *Attorney, Agent, or Firm* — Lucas & Mercanti, LLP

(57) ABSTRACT

The present claimed invention is to facilitate cleaning work of a cell for a particle size distribution measuring device that measures a particle size distribution by means of a line start method, and comprises a cell 2 that houses a density gradient solution, a cell rotating mechanism 3 that rotates the cell 2 so that a centrifugal force is applied to the cell 2 from a smaller density gradient to a larger density gradient and a sample introducing mechanism 7 that introduces a measurement sample into the cell 2 that is rotated by the cell rotating mechanism 3, and is so configured that the cell 2 is detachable from a main body of the device.

9 Claims, 12 Drawing Sheets

(58) Field of Classification Search
CPC ...... G01N 15/045; G01N 15/02; G01N 21/01; G01N 21/03; G01N 21/49; G01N 21/07; G01N 2015/0222; G01N 2015/045; G01N 2015/1087; G01N 2035/0449
USPC .................................. 356/335–343, 73, 246
See application file for complete search history.

(56) References Cited

U.S. PATENT DOCUMENTS

| | | | |
|---|---|---|---|
| 2004/0017568 A1* | 1/2004 | Wyatt ................ | G01N 15/0255 356/338 |
| 2007/0155017 A1* | 7/2007 | Wyatt ................ | G01N 15/0255 436/45 |
| 2019/0346354 A1 | 11/2019 | Yamaguchi | |
| 2019/0353571 A1* | 11/2019 | Mori .................. | G01N 15/0211 |
| 2021/0381944 A1* | 12/2021 | Yamaguchi .......... | G01N 15/042 |
| 2022/0011213 A1* | 1/2022 | Yamaguchi .......... | G01N 15/042 |

FOREIGN PATENT DOCUMENTS

| | | |
|---|---|---|
| JP | 62-115140 U | 7/1987 |
| JP | H03-87636 A | 4/1991 |
| JP | 2016-024024 A | 2/2016 |
| WO | 2018/092573 A1 | 5/2018 |

OTHER PUBLICATIONS

Stephen T. Fitzpatrick, "Particle size analysis by differential centrifugal sedimentation: Advantages and limitations, recent progress, and future trends," Polymer News, 1999, pp. 42-50, vol. 24, with English abstract.

EPO, Extended European Search Report for the corresponding application No. 19880042.7, dated Jun. 20, 2022.

* cited by examiner

CENTRIFUGAL SEDIMENTATION TYPE PARTICLE SIZE DISTRIBUTION MEASURING DEVICE

CROSS REFERENCE TO RELATED APPLICATION

This Application is a 371 of PCT/JP2019/042263 filed on Oct. 29, 2019, which, in turn, claimed the priority of Japanese Patent Application No. 2018-205625 filed on Oct. 31, 2018, both applications are incorporated herein by reference.

FIELD OF THE ART

This invention relates to a centrifugal sedimentation type particle size distribution measuring device.

BACKGROUND ART

A conventional centrifugal sedimentation type particle size distribution measuring device, as shown in a non-patent document 1, uses a line start method in which a sample suspension is supplied to a cell containing a density gradient solution, and centrifuges and sediments particles in the sample suspension in the density gradient solution.

Concretely, the centrifugal sedimentation type particle size distribution measuring device uses a hollow disc-shaped cell, and the density gradient solution is contained in the cell that is rotated at a constant speed, and the sample suspension is injected to the cell from a rotation center part.

However, in order to clean the cell of the centrifugal sedimentation type particle size distribution measuring device, it is not possible to remove the cell from a main body of the device and it is necessary to make the cell empty in a state that the cell is mounted on the main body of the device. As a result of this, there is a problem that a work of cleaning the cell is difficult for the centrifugal sedimentation particle size distribution measuring device that measures a particle size distribution using the line start method.

PRIOR ART DOCUMENTS

Non-Patent Documents

Non-patent document 1: Stephen T. Fitzpatrick "Particle size analysis by differential centrifugal sedimentation: Advantages and limitations, recent progress, and future trends" [retrieved May 30, 2018], Internets (URL: https://www.nihon-rufuto.com/myadmin/rufuto_catalog/wp-content/uploads/2017/06/CPS-Polymer-News.pdf)

DISCLOSURE OF THE INVENTION

Problems to be Solved by the Invention

The present claimed invention has been made to solve the above-mentioned problems, and a main object of this invention is to facilitate cleaning of a cell for a particle size distribution measuring device that measures a particle size distribution by means of a line start method.

Means to Solve the Problems

More specifically, the centrifugal sedimentation type particle size distribution measuring device in accordance with this invention comprises a cell that houses a density gradient solution as being a solution in which a density gradient is formed, a cell rotating mechanism that rotates the cell so that a centrifugal force is applied to the cell from a smaller density gradient to a larger density gradient and a sample introducing mechanism that introduces a measurement sample into the cell that is rotated by the cell rotating mechanism, and the cell is configured to be detachable from a main body of the device.

In accordance with this arrangement, it is possible to conduct the measurement by using the line start method by introducing the measurement sample into the cell rotated by the cell rotating mechanism by means of the sample introducing mechanism. Since the cell is mounted on the main body of the device in a detachable manner, it is possible to facilitate cleaning of the cell in the particle size distribution measuring device using the line start method.

It is conceivable that the cell rotating mechanism has a cell holding body on which the cell is mounted. In accordance with this arrangement, it is preferable that the cell is configured to be detachable from the main body by configuring the cell to be detachable from the cell holding body.

In accordance with this arrangement, the cell is the only component to be removed from the main body of the device so that it is possible to facilitate the removal work and the subsequent cleaning work. In addition, the cell may be detachable from the main body of the device by configuring the cell holding body to be detachable from the main body of the device.

As a concrete configuration of the sample introducing mechanism, it is preferable that the sample introducing mechanism is arranged in the cell rotating mechanism, and has a sample introducing tube whose one end is connected to the cell and whose other end opens at a rotation center part of the cell rotating mechanism.

Since the other end of the sample introducing tube is open at the rotation center part so that the opening stays at the rotation center part, it is possible to facilitate introducing the measurement sample.

It is preferable that the sample introducing mechanism is arranged outside of the cell rotating mechanism and has a sample introducing needle that is capable of making advancing and retreating movements with respect to the other end of the sample introducing tube, and an elastic body that urges the sample introducing needle in a retreating direction.

At this time, the measurement sample is introduced in a state in which the sample introducing needle enters the other end part of the sample introducing tube. This makes it easier to introduce the measurement sample into the sample introducing tube. After the sample is introduced, the sample introducing needle retreats from the other end of the sample introducing tube by the elastic body. This prevents the sample introducing needle from coming into contact with the sample introducing tube and interfering with its rotation or damaging it when the cell rotating mechanism rotates.

In case of conducting a measurement by the line start method by the use of the above-mentioned centrifugal sedimentation particle size distribution measuring device, it is conceivable that a timing when the measurement sample is introduced into the cell is set to be a measurement start timing.

However, it is difficult for a user to simultaneously introduce the sample and press the measurement start button of the particle size distribution measuring device.

In order to preferably solve this problem, it is preferable that the cell has a partition membrane that separates the density gradient solution from the introduced measurement sample, and a breaking mechanism that breaks the partition membrane in case that a rotation speed of the cell rotating mechanism exceeds or equal to a predetermined value.

In accordance with this arrangement, since it is possible to make the timing when the cell rotating mechanism is set to a predetermined rotation speed coincide with the timing when the measurement of the line start method starts, the measurement accuracy can be improved. In addition, the user can introduce the measurement sample into the cell regardless of the operation of pressing the measurement start button.

In order to improve the usability of the centrifugal sedimentation particle size distribution measuring device, it is preferable that a line start method and a uniform sedimentation method are switchable.

In order to make it easy for the user to make the sample introducing timing coincide with the measurement start timing of the line start method when the user introduces the measurement sample using the sample introducing mechanism, it is preferable that the particle size distribution measuring device has a reporting part that reports a start timing of the line start method that uses the sample introducing mechanism.

The centrifugal sedimentation particle size distribution measuring device further comprises a light source and a photo detector that are arranged across an area where the cell passes when the cell is rotated by the cell rotating mechanism. In this case, it is preferable that the centrifugal sedimentation particle size distribution measuring device is so configured that a light focusing lens is arranged between the light source and the area, or between the photo detector and the area.

In accordance with this arrangement, since the amount of the light irradiated on the cell can be increased or the amount of the light detected by the photo detector can be increased, it is possible to improve the measurement accuracy.

It is conceivable that LEDs are used as the light source. In this case, by installing the above-mentioned focusing lens, since the image of the wiring of the LED is formed on the photodetector, there might be an adverse effect on the measurement accuracy.

In order to preferably solve this problem, it is desirable that the wiring direction of the LED electrode is along the rotation direction of the cell.

In accordance with this arrangement, since the wiring direction of the electrode is arranged along the rotation direction of the cell, the image of the wiring is less likely to be formed by the photo detector. As a result of this, it is possible to reduce an adverse effect on the measurement accuracy. In addition, it is possible to prevent deterioration of the measurement accuracy due to vibration of the cell caused by the misalignment of the rotation axis of the cell rotating mechanism.

Effect of the Invention

In accordance with the above-mentioned present claimed invention, it is possible to facilitate the cleaning of the cell of the particle size distribution measuring device that measures the particle size distribution by means of the line start method.

EXPLANATION OF CODES

Figure 1:
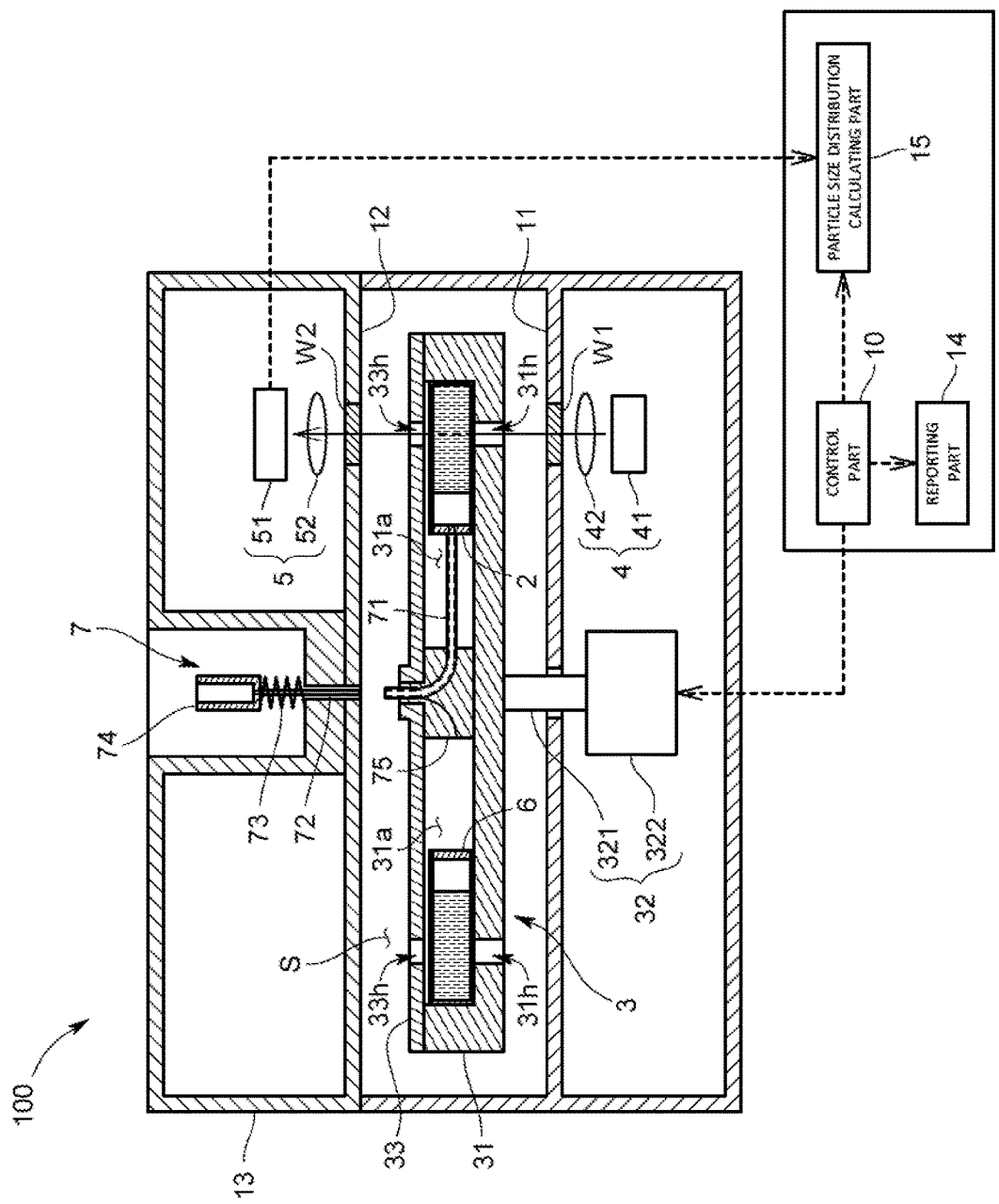
FIG. 1 A view schematically showing a centrifugal sedimentation type particle size distribution measuring device of one embodiment in accordance with this invention.

100 . . . centrifugal sedimentation type particle size distribution measuring device
2 . . . measurement cell
3 . . . cell rotating mechanism
31 . . . cell holding body
7 . . . sample introducing mechanism
71 . . . sample introducing tube
72 . . . sample introducing needle
73 . . . elastic body
14 . . . reporting part
41 . . . light source (LED)
42 . . . light focusing lens
51 . . . photo detector
52 . . . light focusing lens
21 . . . partitioning membrane
22 . . . breaking mechanism

BEST MODES OF EMBODYING THE INVENTION

A centrifugal sedimentation type particle size distribution measuring device according to one embodiment of the present claimed invention will be described below with reference to drawings.

The centrifugal sedimentation type particle size distribution measuring device 100 of this embodiment measures a particle size distribution by means of a line start method, as shown in FIG. 1, and comprises a measurement cell 2 that houses a density gradient solution and a measurement sample, a cell rotating mechanism 3 that rotates the measurement cell 2, and the light irradiation part 4 and the light detection part 5 arranged across a rotation passage area of the measurement cell 2 rotated by the cell rotating mechanism 3. The measurement sample in this embodiment is a sample suspension in which particles are dispersed.

The measurement cell 2 is a rectangular cell made of a translucent material such as a resin. The density gradient solution as being a solution in which a density gradient is formed, is housed in this measurement cell 2. This density gradient solution is formed by using multiple sucrose solutions each of which has a different concentration and is housed in a multilayered form so that the density gradually increases toward a bottom side of the measurement cell 2. In this embodiment, a reference cell 6 is also arranged, and water is housed in the reference cell 6.

The cell rotating mechanism 3 rotates the measurement cell 2 so as to apply a centrifugal force from the smaller to the larger density gradient.

Concretely, the cell rotating mechanism 3 comprises a cell holding body 31 on which the measurement cell 2 and the reference cell 6 are detachably mounted, and a rotating part 32 that rotates the cell holding body 31.

Figure 2:
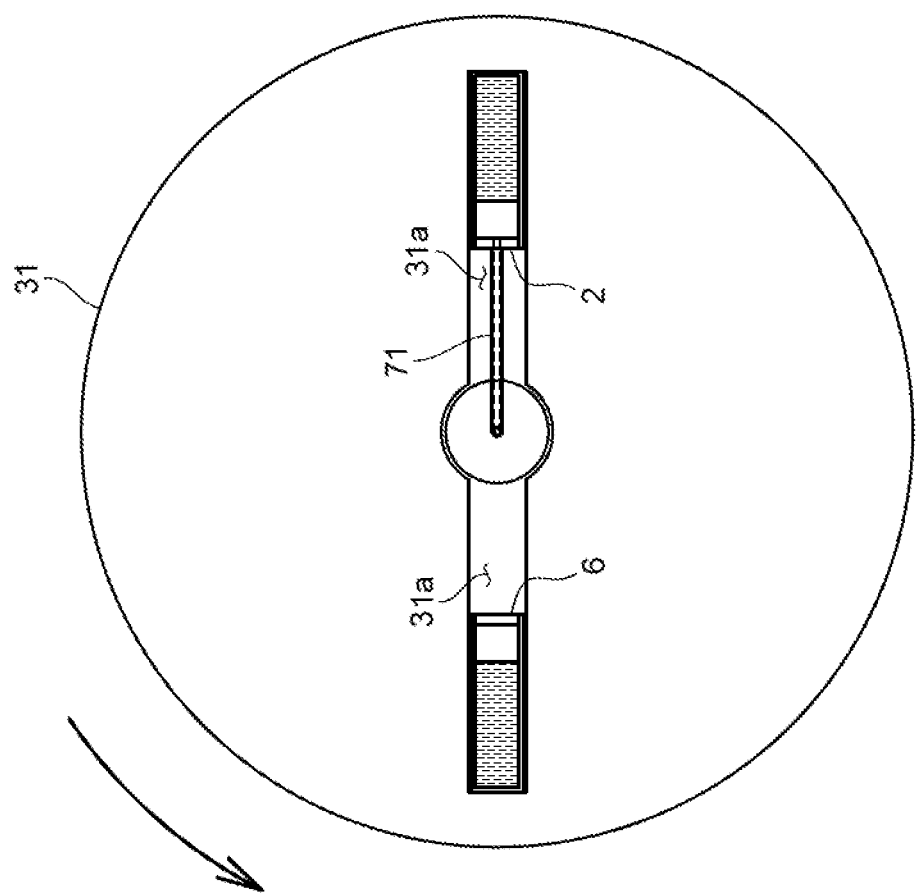
FIG. 2 A plan view of a cell holding body on which a cell is mounted in accordance with this embodiment.

The cell holding body 31 is, for example, a disk shape, as shown in FIG. 2, and the measurement cell 2 and the reference cell 6 are mounted on the cell holding body 31 across a center of rotation of the cell holding body 31. Here, the measurement cell 2 is mounted in a state wherein the direction of the density gradient is along the radial direction of the cell holding body 31. In addition, the cell holding body 31 has a mounting recess part 31a corresponding to a shape of the measurement cell 2, and the measurement cell 2 and the reference cell 6 are mounted by fittingly inserting into the mounting recess part 31a respectively. Furthermore, a guide mechanism (not shown in drawings) is arranged between the measurement cell 2 and the mounting recess part 31a and between the reference cell 6 and the mounting recess 31a. The guide mechanism comprises a guide rail arranged on the mounting recess part 31a or one of the cells 2, 6, and a guide groove arranged on the other. The guide rail or the guide groove arranged on the cell 2 or 6 may be provided integrally with the cell 2 or 6, or may be provided on a component mounted on the cell 2 or 6.

The measurement cell 2 and the reference cell 6 are configured to be detachable from the cell holding body 31. By making these cells 2 and 6 detachable from the cell holding body 31, the cells 2 and 6 become detachable from the main body of the device 100. When the cells 2 and 6 are dismounted from the main body of the device 100, an open/close lid 13 is in a state of being open.

In addition, a cover body 33 is arranged on an upper surface of the cell holding body 31 to prevent the measurement cell 2 and the reference cell 6 from accidentally getting out of place during rotation (refer to FIG. 1). By covering the upper surface of the cell holding body 31 with the cover 33, an uneven structure of the upper surface of the cell holding body 31 is reduced and the frictional resistance during rotation is reduced so that it is possible to make the cell holding body 31 easier to rotate and to reduce the frictional heat generated by rotation.

The measurement cell 2 is mounted on the cell holding body 31 in such a way that the one with the larger density is mounted on the outside in the radial direction of the cell holding body 31. In accordance with this arrangement, the centrifugal force is applied to the measurement cell 2 from the one with the smaller density gradient to the one with the larger density gradient as the cell holding body 31 rotates.

As shown in FIG. 1, the rotating part 32 comprises a rotation axis 321 connected to a center part of the lower surface of the cell holding body 31 and a motor 322 that rotates the rotation axis 321. The number of rotations of the motor 322 is controlled by a control part 10. The rotation axis 321 may be integrally formed with the cell holding body 31 or separately formed. In addition, the rotation axis 321 may comprise a single member or a plurality of members connected each other.

The above-mentioned cell holding body 31 is housed in a storage space (S) formed inside of the particle size distribution measuring instrument 100. The rotation axis 321 of the rotating part 32 penetrates a lower wall 11 forming the housing space (S). In addition, an upper wall 12 forming the housing space (S) is formed by the open/close lid 13 that is opened or closed when the measurement cell 2 is mounted or dismounted.

As shown in FIG. 1, the light irradiating part 4 is arranged below the rotation passage area (cell holding body 31) of the cells 2 and 6. The light irradiating part 4 of this embodiment is arranged on the lower side than the lower wall 11 of the housing space (S) and irradiates the light toward the cells 2 and 6 through a light transmitting window (W1) formed in the lower wall 11. Concretely, the light irradiating part 4 has a light source 41 and a light focusing lens 42 that focuses the light emitted from the light source 41. The light emitted by the light irradiating part 4 is irradiated on the measurement cell 2 or the reference cell 6 through the light passage bore 31h formed in the cell holding body 31.

Figure 3:
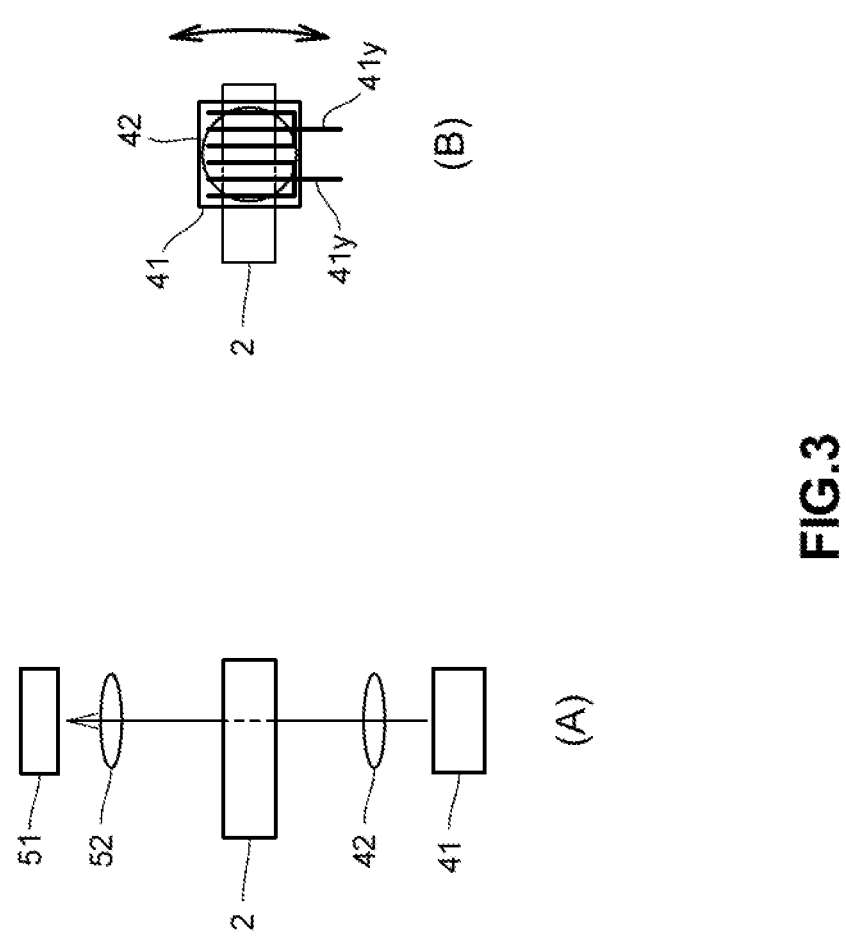
FIG. 3 Views each of which schematically shows a configuration of a light irradiation part in accordance with this embodiment; (A) is a view from a side, and (B) is a view from above.

The light source 41 is, as shown in FIG. 3, an LED having a pectinate electrode. The LED 41 is arranged in such a way that the wiring direction of its electrode is along the rotation direction of the cells 2 and 6.

As shown in FIG. 1, a light detecting part 5 is arranged above the rotation passage area (the cell holding body 31) of the cells 2 and 6. The light detecting part 5 of this embodiment is arranged above the upper wall 12 of the housing space (S) and detects the light that permeates the cells 2 and 6 through the light transmitting window (W2) formed in the upper wall 12. Specifically, the light detecting part 5 has a photo detector 51 and a light focusing lens 52 that focuses the light detected by the photo detector 51. The light detected by the light detecting part 5 is the light that passes through the cells 2 and 6, passes through a light passage bore 33h formed on the cover body 33, and is focused by the light focusing lens 52.

Here, the light focusing lens 42 of the light irradiating part 4 and the light focusing lens 52 of the light detecting part 5 are set so that an observation area by the photo detector 51 is the light emitting area that does not include wiring 41y arranged across the electrode. In accordance with this arrangement, an image of the wiring 41y of the LED 41 formed on the light detector 51 can be avoided so that it is possible to prevent the measurement accuracy from being degraded.

The light intensity signal obtained by the photo detector 51 is obtained by the particle size distribution calculating part 15, and the particle size distribution data is calculated by the particle size distribution calculating part 15. The particle size distribution data is displayed on a display part (not shown in drawings).

Figure 4:
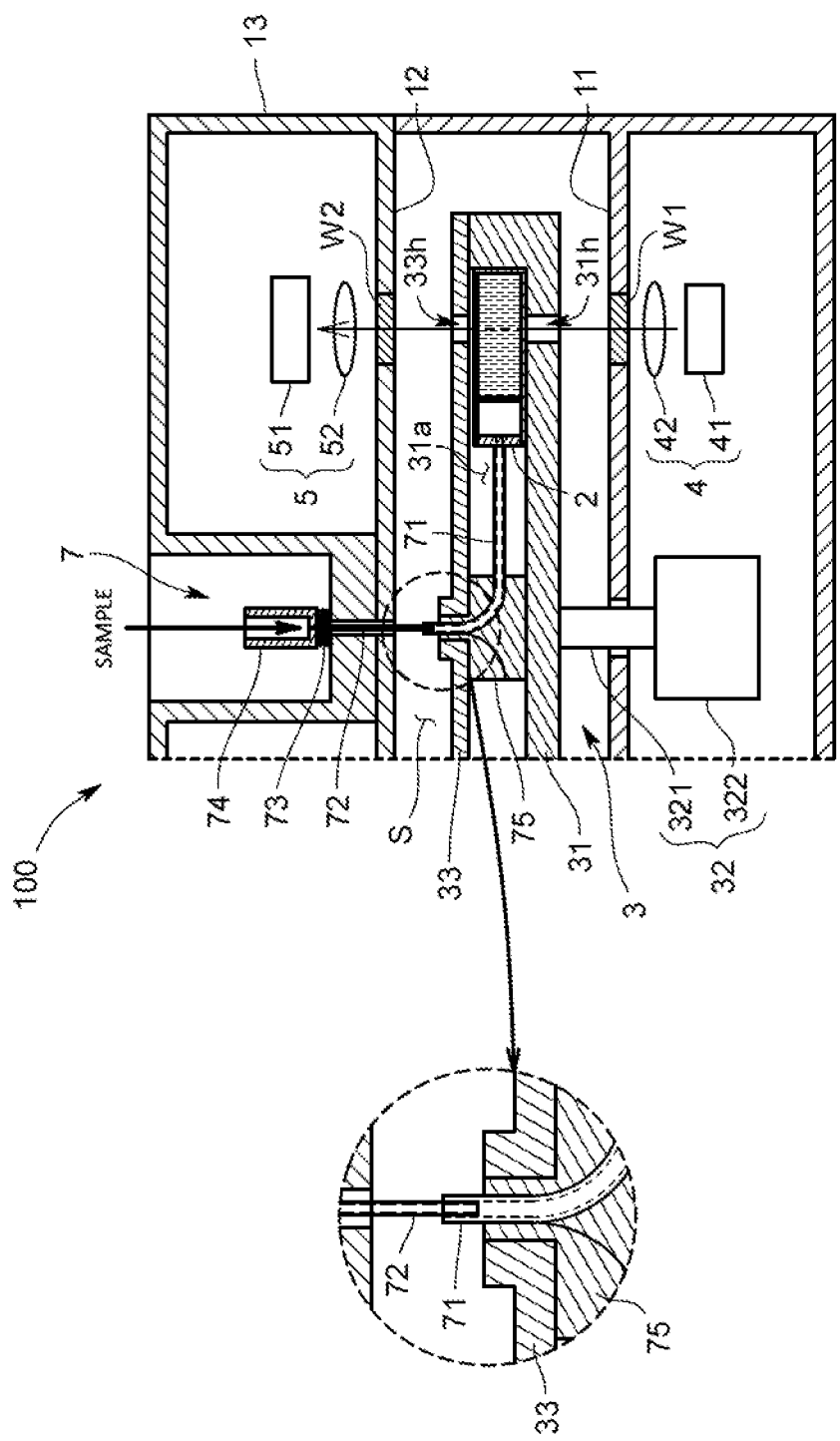
FIG. 4 A partial cross-sectional view schematically showing a state at a time when a measurement sample is introduced in accordance with this embodiment.

As shown in FIG. 1 and FIG. 4, the particle size distribution measurement device 100 of this embodiment comprises a sample introducing mechanism 7 that introduces the measurement sample into the measurement cell 2 that is rotated by the cell rotating mechanism 3.

The sample introducing mechanism 7 is arranged in the cell rotating mechanism 3, and has a sample introducing tube 71 whose one end is connected to the measurement cell 2 and whose other end opens at the rotation center part of the cell rotating mechanism 3.

The sample introducing tube 71 may be integrally formed with a cap of the measurement cell 2, or may be detachably connected to the cap of the measurement cell 2. In case that the sample introducing tube 71 and the cap of the measurement cell 2 are integrally formed, the sample introducing tube 71 can be detached from the cell holding body 31 as well as the measurement cell 2.

In this configuration, the other end of the sample introducing tube 71 is deformed into a curved shape, for example, a circular arc shape, by a deformation block 75 so that the opening of the other end faces upward.

In addition, the sample introducing mechanism 7 is arranged in an outside of the cell rotating mechanism 3 and has a sample introducing needle 72 that is capable of making advancing and retreating movements with respect to the other end part of the sample introducing tube 71, and an elastic body 73 that urges the sample introducing needle 72 in a retreating direction.

The sample introducing needle 72 is arranged on the open/close lid 13 locating at an upper part of the cell holding body 31 so that it can be moved up and down. At the upper end part of the sample introducing needle 72 provided is an injection part 74 into which a measurement sample is injected by, for example, a pipette. A distal end part of the pipette is inserted into the injection part 74 to inject the measurement sample, the measurement sample is introduced from the sample introducing needle 72 into the sample introducing tube 71 through the injection part 74.

The elastic body 73 is, for example, a coil spring, and urges the sample introducing needle 72 upward so that the sample introducing needle 72 is housed from a bottom surface of the open/close lid 13 to the upper side.

In this sample introducing mechanism 7, in case of introducing the measurement, for example, the pipette is inserted into the injection part 74 and the sample introducing needle 72 is pushed downward. With this procedure, the sample introducing needle 72 is in a state of being inserted into the other end part of the sample introducing tube 71. In this state, when the measurement sample is injected into the injection part 74, the measurement sample is introduced into the sample introducing tube 71 from the sample introducing needle 72.

On the other hand, after the measurement sample is introduced, when the pipette is removed from the injection part 74, the sample introducing needle 72 moves upward by the elastic recovery force of the elastic body 73, and the sample introducing needle 72 retreats to the upper side of the lower surface of the open/close lid 13. After the measurement sample is introduced, the sample introducing tube 71 may be closed to prevent volatilization of the measurement sample during the measurement, and a shut-off mechanism may be arranged to shut off the internal space of the measurement cell 2 from the outside. As an example of this shut-off mechanism, a lid that closes the opening of the other end of the sample introducing tube 71 may be arranged.

When the measurement sample is introduced into the measurement cell 2 by the use of the sample introducing mechanism 7, the particle size distribution measurement by the line start method is started. In accordance with the line start method, the time after introducing the measurement sample is measured, and it is necessary to start the measurement by pressing a measurement start button (not shown in drawings) of the particle size distribution measuring device 100.

In this embodiment, a labor for the user simultaneously to introduce the measurement sample and to press the measurement start button of the device 100 is eliminated since the timing for introducing the measurement sample is controlled by the device 100. Concretely, the particle size distribution measuring device 100 has a reporting part 14 that informs the user of a start timing of the line start method using the sample introducing mechanism 7. The reporting part 14 informs the user of the timing of introducing the sample, for example, by sound. It is conceivable that the sample introducing timing is notified, for example, by countdown. In addition, the sample introducing timing may also be indicated on a display (not shown in drawings). The particle size distribution calculating part 15 starts the measurement of the particle size distribution at this sample introducing timing.

Figure 5:
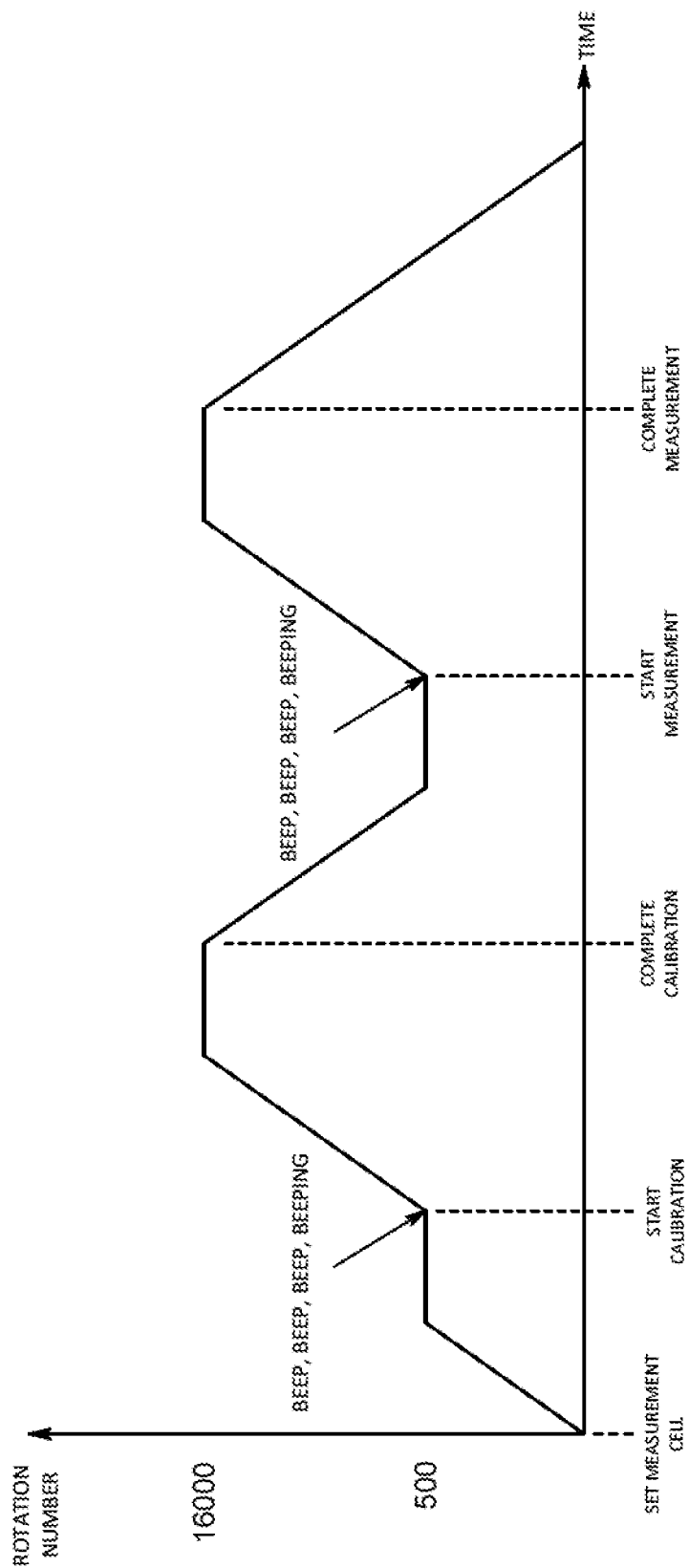
FIG. 5 A schematic view showing a measuring procedure of the particle size distribution measuring device and a manner of reporting by the reporting part in accordance with this embodiment.

Next, the measurement procedure of the particle size distribution measuring device 100 will be briefly explained with reference to FIG. 5, together with a manner in which the reporting part 14 informs the user.

First, the empty measurement cell 2 is set in the cell holding body 31.

Press a "ready" button that indicates completion of preparation, press a "START" button to start rotation and wait until the measurement cell 2 reaches the set rotation speed (for example, 500 rpm) by the cell rotating mechanism 3.

Subsequently, a plurality of sucrose solutions with different concentrations are injected into the measurement cell 2 from the high concentration side through the sample introducing mechanism 7 to form a density gradient solution in the measurement cell 2.

Then, press a "Cal" button for calibration, and press the "START" button, and then the reporting part 14 starts "beep, beep, beep, beeping". At a timing of the last "beeping", introduce a calibration solution into the measurement cell 2 through the sample introducing mechanism 7. The timing of the last "beeping" is a timing of introducing the calibration solution/start of rotation rise/start of data acquisition. At this timing, the measurement of the calibration solution starts.

When the measurement of the calibration solution is completed, press a "Ready" button and the "START" button to return to the rotation of 500 rpm.

Then, press a "Meas" button to start the measurement, and press the "START" button, and then the reporting part 14 starts "beep, beep, beep, beeping". At the timing of the last "beeping, introduce the measurement sample into the measurement cell 2 through the sample introducing mechanism 7. The timing of the last "beeping" is the timing of introducing the measurement sample/rotation rise start/start of data acquisition. At this timing, the measurement of the measurement sample starts.

Effects of this Embodiment

In accordance with the centrifugal sedimentation type particle size distribution measuring device 100 of this embodiment, the line start method can be performed by introducing the measurement sample into the measurement cell 2 that is rotated by the cell rotating mechanism 3 by the use of the sample introducing mechanism 7. Since the measurement cell 2 is detachably mounted on the main body of the device 100, it is possible to facilitate cleaning of the measurement cell 2 of the particle size distribution measurement device 100 that conducts the particle size distribution measurement by the line start method. In particular, since the measurement cell 2 is detachable from the main body of the device 100 by making the measurement cell 2 detachable from the cell holding body 31, it is possible to facilitate the detaching work of the measurement cell 2 and to facilitate handling the measurement cell 2 during cleaning.

Since the sample introducing needle 72 of the sample introducing mechanism 7 is capable of making advancing and retreating movements with respect to the other end part of the sample introducing tube 71 and the measurement sample is introduced in a state that the sample introducing needle 72 enters the other end part of the sample introducing tube 71, the measurement sample can be easily introduced into the sample introducing tube 71. In addition, since the sample introducing needle 72 is retreated from the other end part of the sample introducing tube 71 by the elastic body 73 after the sample is introduced, it is possible to avoid interference of rotation of the cell rotating mechanism 3 or to prevent the sample introducing needle 72 and the sample introducing tube 71 from being damaged because the sample introducing needle 72 makes contact with the sample introducing tube 71 when the cell rotating mechanism 3 rotates.

Since the sample introducing timing is reported by the reporting part 14, it is possible to make it easy to match the sample introducing timing with the measurement start timing of the line start method when the user introduces the measurement sample by the use of the sample introducing mechanism 7.

Other Modified Embodiments

The present claimed invention is not limited to the above-mentioned embodiments.

Figure 6:
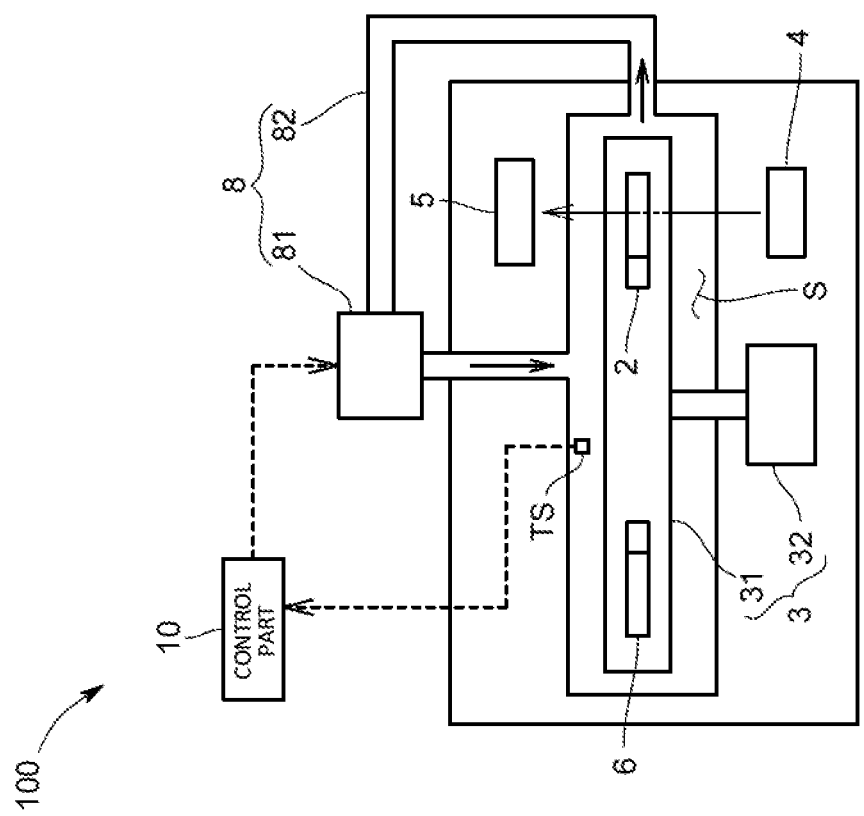
FIG. 6 A view schematically showing a configuration of the centrifugal sedimentation type particle size distribution measuring device in accordance with a modified embodiment.

For example, as shown in FIG. 6, the particle size distribution measuring device 100 may further comprise a cooling mechanism 8 for cooling the measurement cell 2 and the reference cell 6.

The cooling mechanism 8 cools the cells 2 and 6 by supplying cold air to a housing space (S) that houses the cell holding body 31 in a rotatable manner. Concretely, the cooling mechanism 8 comprises a cooler 81 and a supply channel 82 that supplies a gas cooled by the cooler 81 to the housing space (S). The cooler 81 may use a Peltier element or a cooling medium. In FIG. 6, an example is shown where the cooler 81 is arranged outside the main body of the device 100, but it can also be arranged inside the device 100.

In addition, one end of the supply channel 82 is connected to the outer side of the housing space (S) in the radial direction, and the other end of the supply channel 82 is connected to the center of rotation of the cell holding body 31 in the housing space (S) or its vicinity. In the supply channel 82 connected in this way, the one end connected to the outside in the radial direction becomes a positive pressure, and the other end connected to the center of rotation or its vicinity becomes a negative pressure. In accordance with this arrangement, the gas flows in the supply channel 82 from one end to the other. On the way, the gas is cooled by the cooler 81, and the cooled gas is supplied to the center part of the housing space (S). The cooled gas then flows radially outward in the housing space (S) and flows into the one end of the supply channel 82. Then, the gas circulates through the supply channel 82. A circulation pump to circulate the gas may be arranged in the supply channel 82.

The cooler 81 of the cooling mechanism 8 is controlled by a control part 10. Concretely, a temperature sensor (TS) to detect the temperature in the housing space (S) is provided, and the cooler 81 is controlled based on the detected temperature by the temperature sensor (TS). In case that the circulation pump is provided, the control part 10 may control the rotation speed of the circulation pump to adjust the circulation flow rate.

Since it is possible to keep the temperature in the housing space (S) constant by means of the cooling mechanism 8, viscosity, density or a refractive index of the density gradient solution can be kept constant so that it is possible to measure a sedimentation velocity of the particles accurately. As a result of this, the particle size distribution can be accurately measured. In addition, since the inner surface of the housing space (S) (especially the upper and lower surfaces) is flush without unevenness, it is possible to reduce temperature irregularities without localized frictional heat and to keep the temperature in the housing space (S) much more constant together with the effect by the cooling mechanism 8.

In addition, the particle size distribution calculating part 15 of the particle size distribution measuring device 100 may correct the temperature of the particle size distribution data calculated based on the light intensity signal from the photo detector 51 by the use of the detected temperature of the temperature sensor (TS).

Figure 7:
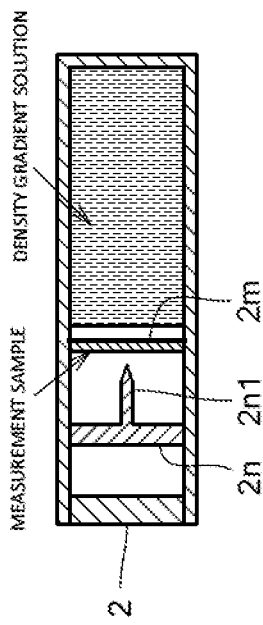
FIG. 7 Views each of which schematically shows a configuration of a measurement cell in accordance with the modified embodiment; (A) is a view before a partitioning membrane is broken, and (B) is a view after the partitioning membrane is broken.
Figure 7:
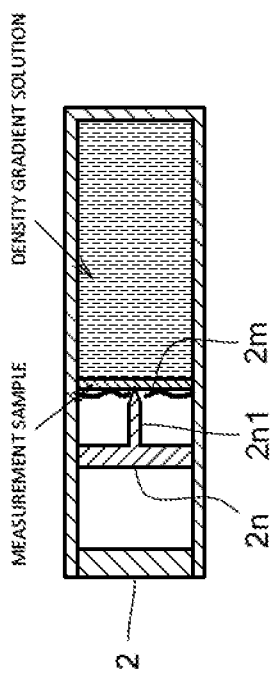

As shown in FIG. 7, it is preferable that the measurement cell 2 has a partition membrane 2*m* made of, for example, resin to partition the density gradient solution from the introduced measurement sample, and a breaking mechanism 2*n* to break the partition membrane 2*m* in case that the rotation speed of the cell rotating mechanism 3 exceeds a predetermined value. The sample introducing mechanism 7 of the above embodiment is not necessary for the measurement cell 2 having this arrangement. The breaking mechanism 2*n* is capable of, for example, a sliding movement inside the cell and breaks the partition membrane 2*m* by moving toward a side of the partition membrane 2*m* inside the cell due to the centrifugal force generated when the rotation speed of the cell rotating mechanism 3 exceeds the predetermined value (refer to FIG. 7 (B)). The breaking mechanism 2*n* has a penetration part 2*n*1 such as, for example, a needle that breaks the partition membrane 2*m*.

In the above embodiment, the particle size distribution is measured by the line start method, but it can be measured not by the line start method but by the uniform sedimentation method. In this case, the measurement cell 2 houses the sample dispersion solution in which the particles are dispersed in the medium. In addition, in accordance with the line start method, the timing of introducing the measurement sample or the timing of introducing the measurement sample and pressing the measurement start button is the measurement start timing, while in accordance with the uniform sedimentation method, the timing of starting the rotation of the measurement cell housing the sample dispersion solution is the measurement start timing.

Figure 8:
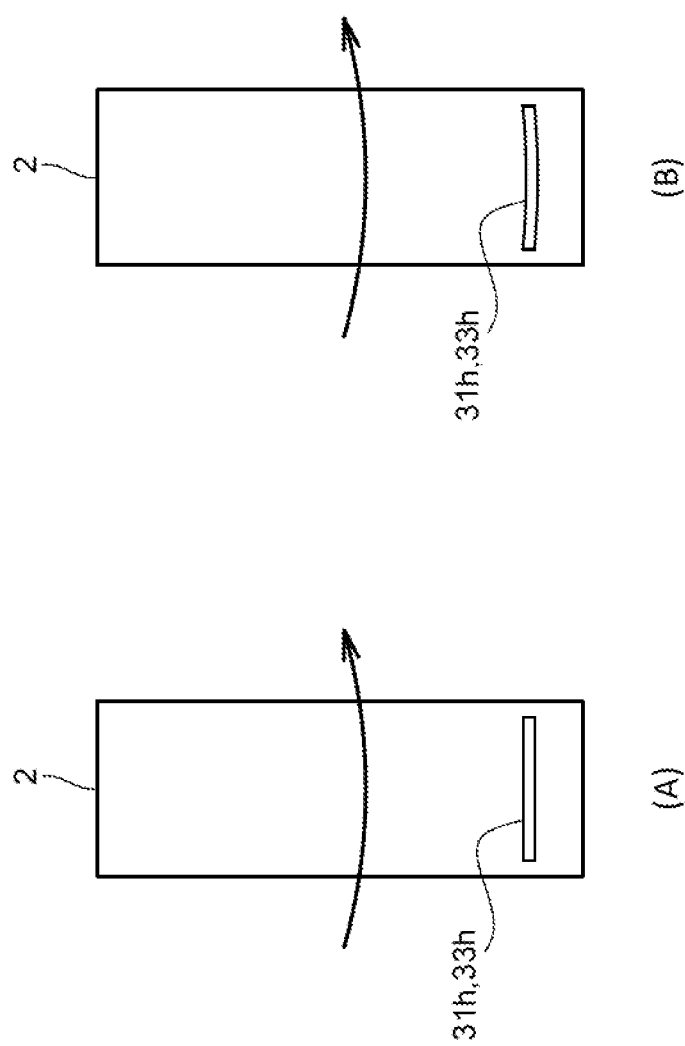
FIG. 8 A schematic diagram showing a modified form of a translucent window.

It is conceivable that an opening shape of the light passage bore 31*h* of the cell holding body 31 and the light passage bore 33*h* of the cover body 33 in the above-mentioned embodiment is circular, however, in this case, the circular shape must be made smaller to improve the resolution. As a result of this, there is a problem that the amount of the light decreases. For this reason, it is conceivable that at least one of the light passage bores 31*h* and 33*h* is made into a straight slit shape extending in a straight line along a tangential direction of the rotation of the cell holding body 31 as shown in FIG. 8(A), or into a circular arc slit shape extending in a circular arc in the direction of the rotation of the cell holding body 31 as shown in FIG. 8(B). As mentioned above, it is possible to improve the resolution while preventing a decrease in the amount of the light by making the light passage bores 31*h* and 33*h* slit shapes. The light passage bore 31*h* of the cell holding body 31, which is in the light input side, should be narrowed to reduce stray light, and the light passage bore 33*h* of the cover body 33, which is in the light output side, should be the above-mentioned slit shape in order to improve the resolution.

Figure 9:
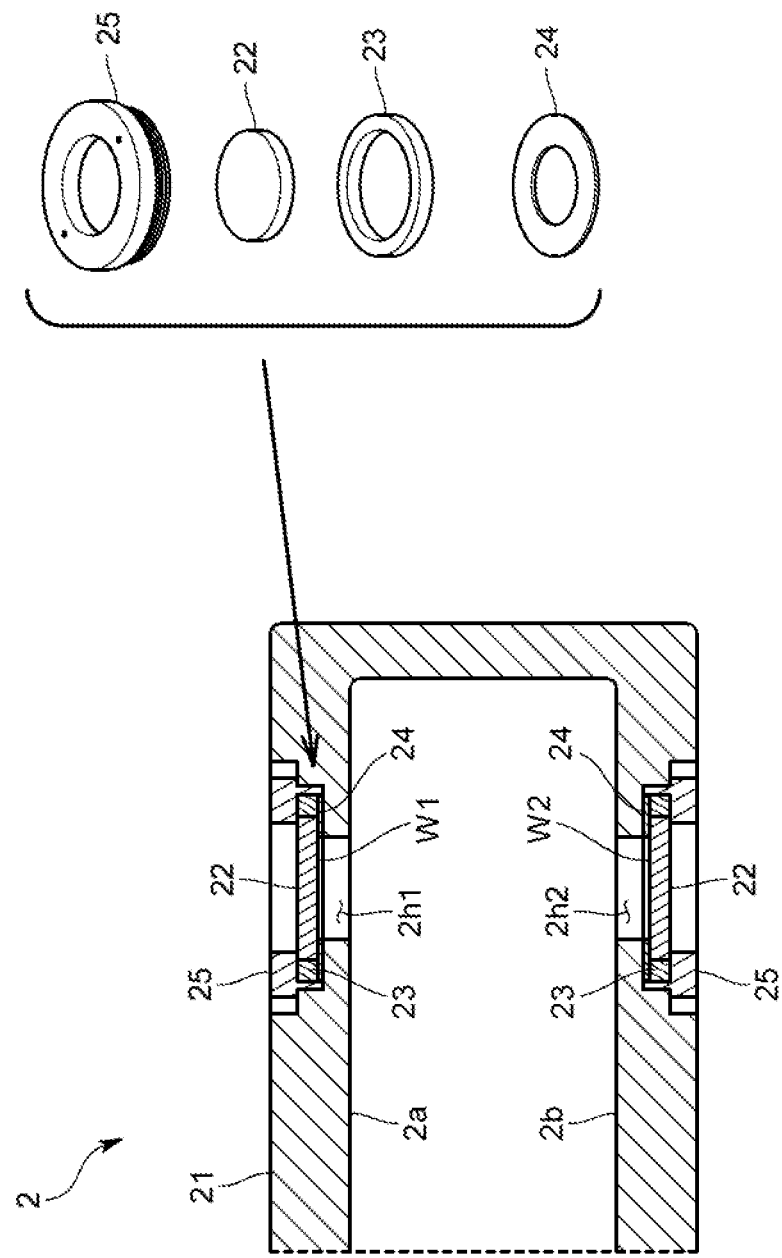
FIG. 9 A cross-sectional view and an exploded view showing a modified form of the measurement cell.

In addition, as shown in FIG. 9, the measurement cell 2 may have a metal cell body 21 forming a space inside of which the measurement sample is stored, and window members 22 arranged on opposite walls 2*a* and 2*b* orthogonal to the centrifugal force direction of the cell body 21. The opposite walls 2*a* and 2*b* have flat plate portions, and the window members 22 are arranged on the flat plate portions of the opposite walls 2*a* and 2*b*. It is conceivable that the window member 22 is arranged so that its inner surface is located on the same plane as that of the inner surface of the flat portions of the opposite walls 2*a* and 2*b* or outside the inner surface of the flat portions of the opposite walls 2*a* and 2*b*. In accordance with this arrangement, when the measurement cell 2 rotates, since the centrifugal force of the measurement sample is not applied to the window member 22 and only the centrifugal force of the window member 22 itself is applied to the window member 22, it is possible to prevent the window member 22 from being damaged.

Concretely, the measurement cell 2 is a metal cell made of, for example, aluminum. As shown in FIG. 9, translucent windows W1 and W2 for transmitting the light are arranged on the opposite walls 2*a* and 2*b* facing each other. By making the cell 2 made of metal, it is possible to make the cell 2 strong enough to withstand the centrifugal force and superior in chemical resistance. In this example, the measurement cell 2 has a bottomed cell body 21 made of metal and a resin cap (not shown in drawings) that seals an opening of the cell body 21.

The translucent windows W1 and W2 are made by installing the window members 22 made of glass in the through bores 2*h*1 and 2*h*2 formed in the opposite walls 2*a* and 2*b* of the cell body 21. Since the window member 22 is made of glass, it has the excellent chemical resistance. The window member 22 in this example has a disk shape and is inserted into a ring-shaped member 23 made of metal. A structure body wherein the window member 22 is inserted into the ring-shaped member 23 is mounted on the through bores 2*h*1 and 2*h*2 through a seal member 24 and is fixed to the side walls 2*a* and 2*b* by a holding member 25. At this time, it is so configured that a tightening force of the holding member 25 is transmitted to the ring-shaped member 23 to prevent the window member 22 from being broken. Although a force of about 30,000 G is applied to the window member 22, only the centrifugal force that is a value obtained by multiplying the mass of the window member 22 by 30,000 G is applied to the window member 22 so that the window member 22 is hardly broken. If the entire cell is made of glass and the sample is contained inside of the cell, the centrifugal force of (mass of the cell+mass of the sample) multiplied by 30,000 G is applied and the cell breaks.

Figure 10:
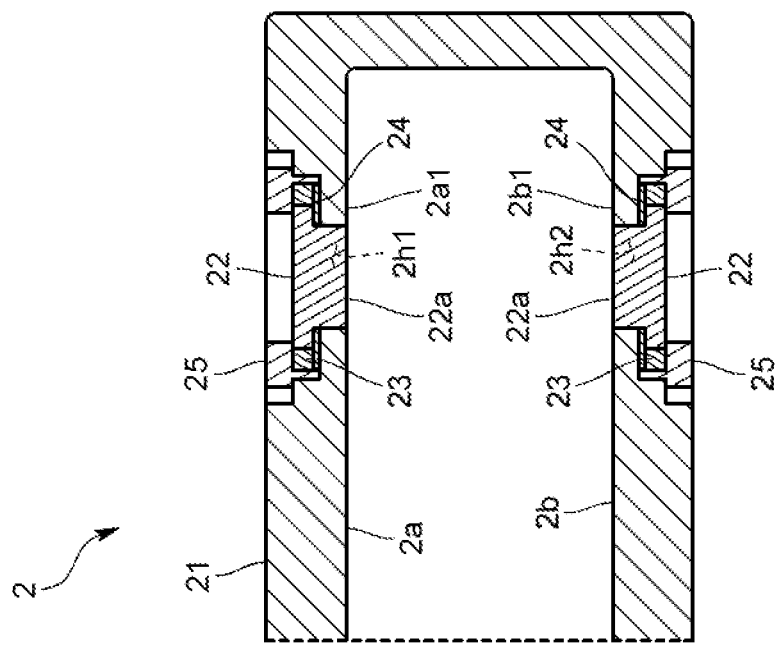
FIG. 10 A cross-sectional view showing a modified form of the measurement cell.

In addition, as shown in FIG. 10, the inner surface 22*a* of the window member 22 may be so configured to be flush with the inner surfaces 2*a*1 and 2*b*1 of the opposite walls 2*a* and 2*b*. In other words, the window member 22 is configured to block the inner openings of the through bores 2*h*1 and 2*h*2. This configuration eliminates the unevenness caused by the through bores 2*h*1 and 2*h*2. As a result of this, it is possible to solve problems such as disturbance of the density gradient in the cell and non-uniform settling of particles.

Figure 11:
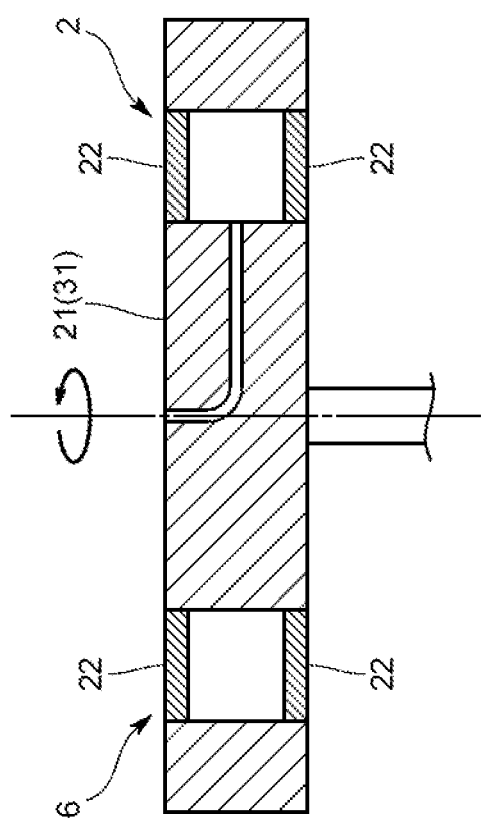
FIG. 11 A cross-sectional view showing a modified form of the measurement cell.

Furthermore, as shown in FIG. 11, the measurement cell 2 and the cell holding body 31 can be integrally configured. In this case, the cell holding body 31 serves as a cell body 21 inside of which forms a space for storing the measurement sample, and the window members 22 are arranged on the opposite walls 2*a* and 2*b* orthogonal to the centrifugal force direction of the cell body 21. In accordance with this arrangement, since only the centrifugal force of the window member itself is applied to the window member without applying the centrifugal force of the measurement sample to the window member, it is possible to prevent the window member from being damaged.

In the above-mentioned embodiment, the measurement cell 2 is configured to be detachable from the main body of the device 100 by being detachable from the cell holding body 31, however the measurement cell 2 may be detachable from the main body of the device 100 by making the cell holding body 31 detachable from the main body of the device 100. Even in this case, it is preferable to make the measurement cell 2 detachable from the cell holding body 31 in order to facilitate the cleaning work of the measurement cell 2.

Figure 12:
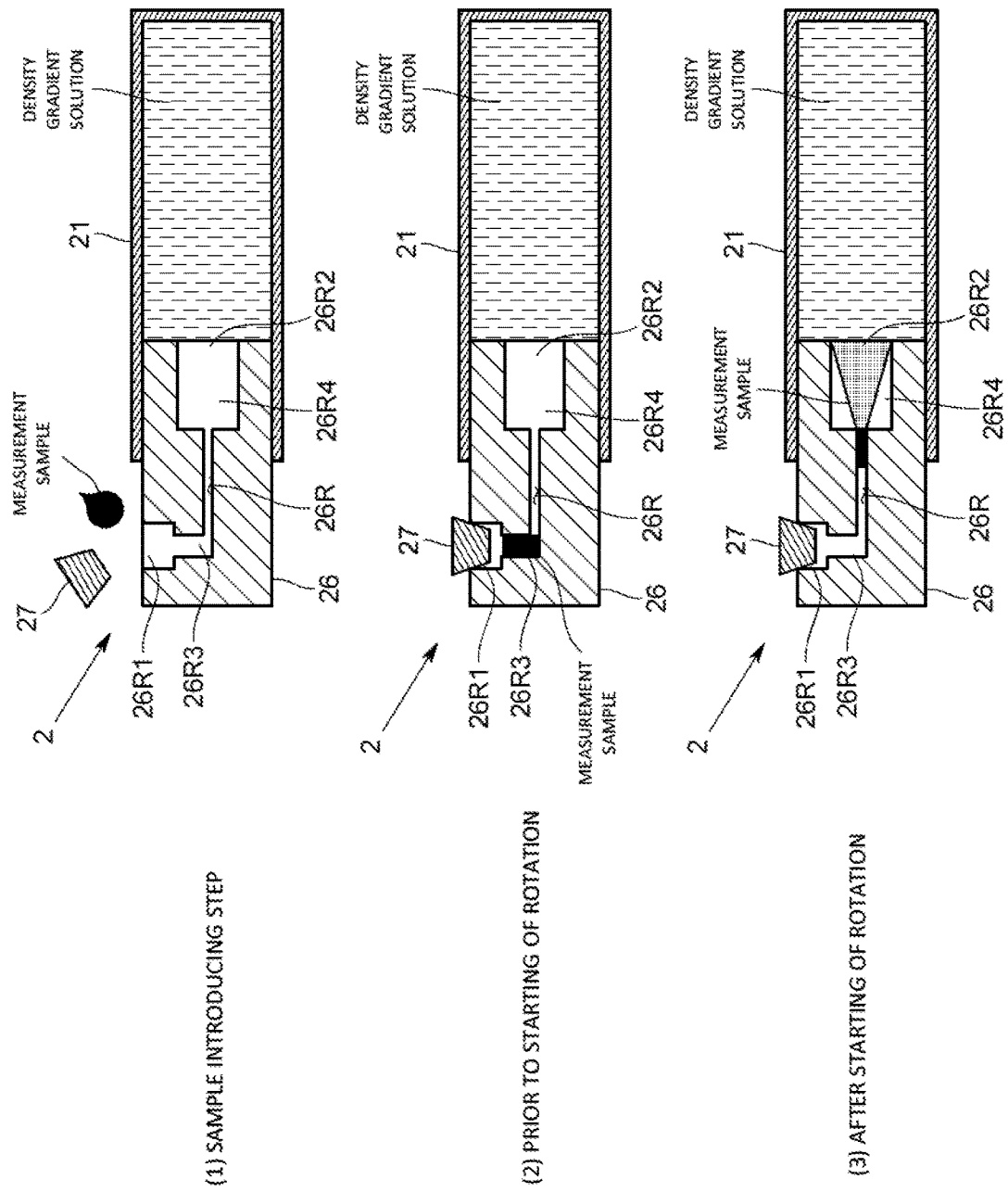
FIG. 12 Cross-sectional views of a modified form of the measurement cell, each of which shows (1) a stage of preparing a sample, (2) a state before rotation is started, and (3) a state after rotation is started.

In addition, the configuration of the measurement cell 2 may be as shown in FIG. 12. In this configuration of the measurement cell 2, the sample introducing mechanism 7 of the above-mentioned embodiment is not necessary. This measurement cell 2 comprises a cell body 21 that has an opening part 21H at one end and that houses the density gradient solution, and a cell cap 26 that seals the opening part 21H of the cell body 21 and inside of which an internal flow channel 26R to hold the measurement sample is formed. The internal flow channel 26R formed in the cell cap 26 has a sample introducing port 26R1 formed at one end and a sample outlet port 26R2 formed at the other end. In a state wherein the cell cap 26 is mounted on the cell body 21, the sample introducing port 26R1 is located outside the cell body 21, and the sample outlet port 26R2 is located inside the cell body 21. In addition, a holding flow channel part 26R3 that temporarily holds the measurement sample, and an enlarged flow channel part 26R4 that is arranged in a downstream side of the holding flow channel part 26R3 and that communicates with the sample outlet port 26R2 are arranged between the sample introducing port 26R1 and the sample outlet port 26R2 in the internal flow channel 26R. The sample introducing port 26R1 and the holding flow channel part 26R3 are arranged along the rotational axis direction of the measurement cell 2, and the enlarged flow channel part 26R4 is arranged along the direction of the centrifugal force applied to the measurement cell 2 (rotational radial direction).

In case of introducing the measurement sample into the measurement cell 2 having the above-mentioned arrangement, as shown in FIG. 12(1), the measurement sample is introduced through the sample introducing port 26R1 in a state wherein the cell cap 26 is mounted on the cell body 21. After the measurement sample is introduced, the measurement sample is held by the holding flow channel part 26R3 (refer to FIG. 12(2)). In addition, after the measurement sample is introduced, the sample introducing port 26R1 may be closed with a lid body 27. By closing the sample introducing port 26R1 with the lid body 27, it is possible to prevent evaporation of the measurement sample and to prevent the density gradient solution from leaking out to the internal flow channel 26R side due to air accumulation in the internal flow channel 26R. Then, when the measurement cell 2 is rotated, the measurement sample moves from the holding flow channel part 26R3 to the enlarged flow channel part 26R4 by the centrifugal force. At this time, as shown in FIG. 12(3), the measurement sample from the holding flow channel part 26R3 spreads in the enlarged flow channel part 26R4 and is introduced into the density gradient solution from the sample outlet port 26R2. This prevents a streaming phenomenon from occurring. In case that there is no enlarged flow channel part 26R4 and the internal flow channel 26R has a single diameter, the measurement sample is introduced into the density gradient solution as a lump, and the streaming phenomenon causes problems such as inaccurate measurement of the particle size distribution.

In addition, the embodiments may be variously modified or combined without departing from a spirit of the present claimed invention.

POSSIBLE APPLICATIONS IN INDUSTRY

In accordance with the present claimed invention, it is possible to facilitate the cleaning of cells in a particle size distribution measuring device that performs a particle size distribution measurement by the line start method.

The invention claimed is:

1. A centrifugal sedimentation type particle size distribution measuring device comprising
   a cell that houses a density gradient solution as being a solution in which a density gradient is formed,
   a cell rotating mechanism that rotates the cell so that a centrifugal force is applied to the cell from a smaller density gradient to a larger density gradient and
   a sample introducing mechanism that introduces a measurement sample into the cell that is rotated by the cell rotating mechanism, wherein
   the cell is configured to be detachable from a main body of the device.

2. The centrifugal sedimentation type particle size distribution measuring device described in claim 1, wherein
   the cell rotating mechanism has a cell holding body on which the cell is mounted, and
   the cell is configured to be detachable from the cell holding body.

3. The centrifugal sedimentation type particle size distribution measuring device described in claim 1 wherein
   the sample introducing mechanism is arranged in the cell rotating mechanism, and has a sample introducing tube whose one end is connected to the cell and whose other end opens at a rotation center part of the cell rotating mechanism.

4. The centrifugal sedimentation type particle size distribution measuring device described in claim 3, wherein
   the sample introducing mechanism is arranged outside of the cell rotating mechanism and has a sample introducing needle that is capable of making advancing and retreating movements with respect to the other end of the sample introducing tube, and an elastic body that urges the sample introducing needle in a retreating direction, and
   the measurement sample is introduced in a state in which the sample introducing needle enters the other end part of the sample introducing tube.

5. The centrifugal sedimentation particle size distribution measuring device described in claim 1, wherein
   the cell has a partition membrane that separates the density gradient solution from the introduced measurement sample, and a breaking mechanism that breaks the partition membrane in case that a rotation speed of the cell rotating mechanism exceeds or equal to a predetermined value.

6. The centrifugal sedimentation particle size distribution measuring device described in claim 1, wherein
   a line start method and a uniform sedimentation method are switchable.

7. The centrifugal sedimentation particle size distribution measuring device described in claim 1, comprising
   a reporting part that reports a start timing of the line start method that uses the sample introducing mechanism.

8. The centrifugal sedimentation particle size distribution measuring device described in claim 1, further comprising
   a light source and a photo detector arranged across an area where the cell passes when the cell is rotated by the cell rotating mechanism, wherein
   a light focusing lens is arranged between the light source and the area, or between the photo detector and the area.

9. The centrifugal sedimentation type particle size distribution measuring device described in claim 8, wherein
   the light source is an LED, and a wiring direction of an electrode of the LED is arranged along a rotation direction of the cell.

* * * * *